M. B. MORGAN.
TRACK WHEEL SUSPENSION FOR TRACK LAYING TRACTORS.
APPLICATION FILED AUG. 25, 1919.
1,337,787.
Patented Apr. 20, 1920.
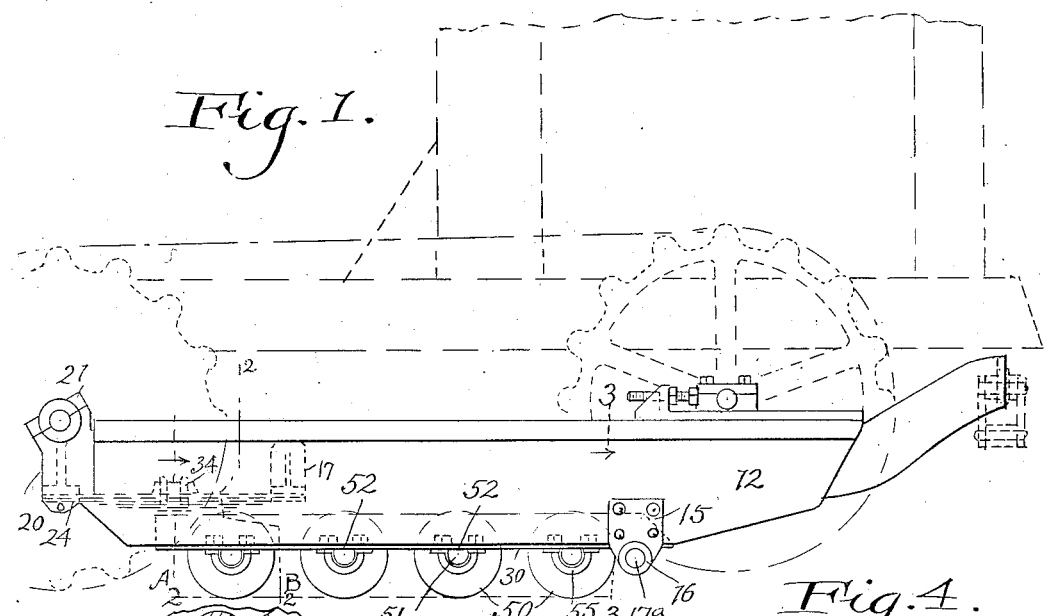
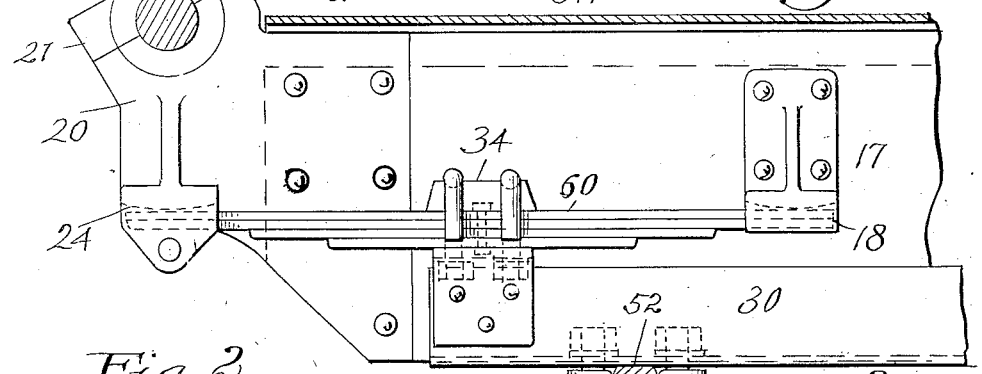
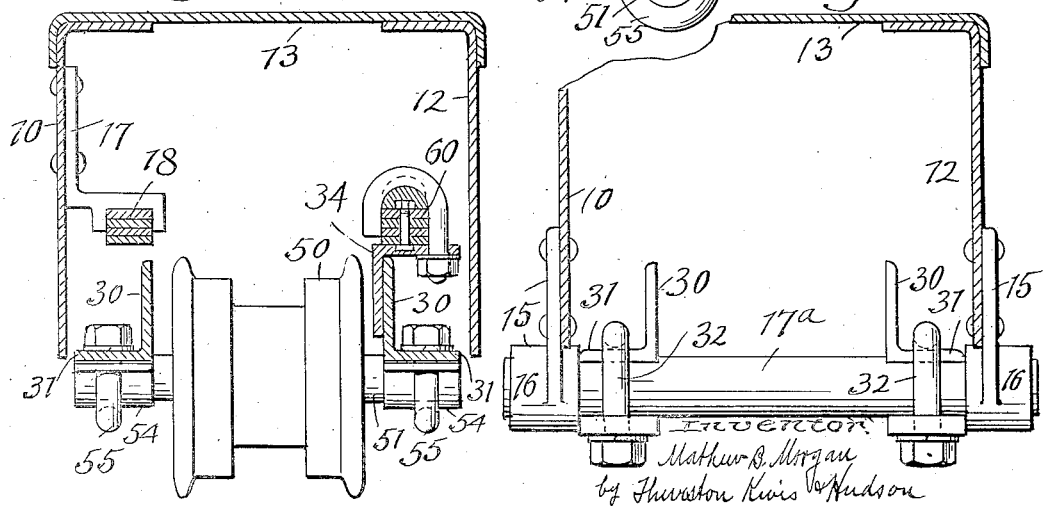

UNITED STATES PATENT OFFICE.

MATHEW B. MORGAN, OF CLEVELAND HEIGHTS, OHIO, ASSIGNOR TO THE CLEVELAND TRACTOR COMPANY, OF EUCLID, OHIO, A CORPORATION OF OHIO.

TRACK-WHEEL SUSPENSION FOR TRACK-LAYING TRACTORS.

1,337,787. Specification of Letters Patent. Patented Apr. 20, 1920.

Application filed August 25, 1919. Serial No. 319,703.

*To all whom it may concern:*

Be it known that I, MATHEW B. MORGAN, a citizen of the United States, residing at Cleveland Heights, in the county of Cuyahoga and State of Ohio, have invented a certain new and useful Improvement in Track-Wheel Suspensions for Track-Laying Tractors, of which the following is a full, clear, and exact description.

This invention is an improvement in the kind of track laying tractors typified in the White Patent No. 1,253,319 in which two track frames lie on opposite sides of the main frame and are pivoted at their rear ends to the rear end of the main frame, and have certain load supporting springs interposed between their front ends and the front end of the main frame.

The invention relates to the means through which the track engaging wheels are supported by the said track frames; the object being to enable the tractor to run more easily, and with less shock and jar upon the tracks when such tracks are laid down on rough ground.

In the drawing, Figure 1 is a side elevation of a track frame, partly broken away, to which the present invention is applied; Fig. 2 is a transverse vertical sectional view, the left side of the view being in the plane of line 2—A on Fig. 1, and the right side of the view in the plane of line 2—B on Fig. 1. Fig. 3 is a transverse vertical section in the plane of line 3—3 on Fig. 1, and Fig. 4 is a central longitudinal vertical section of the rear part of the invention for the purpose of showing the rear spring suspension of the truck.

The track frame comprises two spaced apart side beams 10, 12, which in the form shown are connected together by a top plate 13.

Two bearing brackets 20 are respectively secured to the rear ends of these two side beams; and they carry boxes 21 through which the said track frame may be pivotally connected with a fixed rear axle in substantially the manner disclosed in said prior patent. It is to be understood also that there is to be a suitable load supporting (preferably spring) connection between the front end of the track frame and the main frame, substantially as shown in said prior patent.

The track wheels 50 are mounted on a truck, which at its front end is pivotally connected with the track frame; and has at its rear end a load supporting spring connection with the track frame.

The said truck as shown comprises two parallel spaced apart side bars 30. Each of these is an angle bar; and said bars are so arranged that the horizontal flanges 31 thereof are at their lower edges, and these horizontal flanges extend outwardly, that is, away from each other.

Two bearing box brackets 15 are secured by rivets or the like to the two side beams 10, 12, near their front ends. These brackets carry alined bearing boxes 16, in which a rock shaft 17 is rotatably mounted.

The two truck frame side bars 30, rest upon and are clamped down upon this rock shaft by U-bolts 32; and these side bars lie inside of the side beams 10, 12, of the track frame. At the rear end of the truck are two spring seat brackets 34, which are secured one to each of the truck bars 30. The upper ends of these brackets 34 are clamped tightly against the under side of a leaf spring 60, near the middle thereof. There are two of these leaf springs, one associated with each truck side bar 30. The ends of each leaf spring engage respectively a spring seat 24 formed on the lower end of one of the brackets 20; and a spring seat 18 on a bracket 17 that is riveted to the inner face of the associated side beam 10 or 12 of the truck frame, said spring seats of course engaging the upper surface of the leaf spring.

The track wheels 50 lie between the two side bars of the truck frame; each being rotatively mounted on a shaft 51 that is clamped at its ends to the two truck side bars 30. As shown each shaft has at each end a flat top surface 52 which the lower edge of the bar 30 engages. At each end of the shaft 52 is a half box 54, which embraces the lower half of the shaft, and this half box and the shaft, at each end thereof is clamped by a U-bolt 55 to the associated side bar of the truck.

When the invention as above described is applied to a track laying tractor, substantially as shown in said prior patent, the track frame may rock about the axes of the rear bearing boxes, being restrained by the resiliency of the front spring which is a part of the old construction. And additionally the truck may also rock about its axis of suspension at its front end. When, therefore, the ground on which the track belts are laid down is very rough and uneven, so that the tracks present a series of irregular up and down surfaces, the wheels can follow those surfaces as the result of the automatically coördinated swinging movements of the truck frame and truck. The rear leaf springs 60 absorb much of the upward movement of the rear end of the truck frame without transmitting it to the rear end of the main frame.

Various changes may be made in the specific embodiment of the invention shown and described herein, provided the means stated in any of the following claims or the equivalents of such stated means be employed.

Having described my invention, I claim:—

1. In a track laying tractor in which a track frame is pivotally connected near one end with the main frame and in which there is a resilient load supporting connection interposed between the other end of the track frame and the main frame, the combination with said pivoted track frame, of a truck which is pivoted to the track frame adjacent the spring supported end of the latter, and which has a resilient load supporting connection with the track frame adjacent the pivot of the latter, and track wheels mounted on said truck.

2. In a track laying tractor having a main frame and two track frames which are pivotally connected near their rear ends to the main frame and which have a resilient load supporting connection between their front ends and the main frame, the combination with each of the track frames of a truck which at its front end is pivotally connected on a transverse axis with the track frame near its front end, a resilient load supporting connection between the rear end of the truck and the track frame, and track wheels mounted on said truck.

3. In a track laying tractor of the character specified, the combination with one of the pivoted track frames which includes two spaced apart side beams, of a truck which is located between said two side beams and which is pivotally connected at its front end with both of said track frame side beams, resilient load supporting connections interposed between the rear end of said truck and the side beams of the track frame, and track wheels mounted on said truck.

4. In a track laying tractor of the character specified, the combination of a track frame comprising two spaced apart side beams, a truck which is located between the two side beams of the truck frame, and is pivoted to said track frame near the front end thereof, two leaf springs which are connected near their middle points with the truck near its rear end and two pairs of spring seats fixed to the track frame and engaging said leaf springs near the ends thereof, and track wheels mounted on said truck.

5. In a track laying tractor of the character specified, the combination of a track frame comprising two spaced apart side beams, bearing box brackets at the rear ends of said beams to facilitate pivoting of said track frame to the main frame, and two bearing box brackets secured to the said side beams near the front ends, a rock shaft mounted in the last named bearing box brackets, two parallel truck frame beams fixed to said rock shaft between the two side beams of the track frame, transverse shafts fixed to the said truck beams between the ends thereof, track wheels rotatably mounted upon said shafts, two longitudinally extended leaf springs fixed respectively near their middle points to the two side beams of the truck, two spring seat brackets which are fixed to the inner faces of the side beams of the track frame and which engage respectively the front ends of said leaf springs, and two spring seats which are fixed to the side beams of the track frame and respectively engage said leaf springs near their rear ends.

In testimony whereof, I hereunto affix my signature.

MATHEW B. MORGAN.